United States Patent
Takagi et al.

(10) Patent No.: US 8,340,019 B2
(45) Date of Patent: Dec. 25, 2012

(54) RADIO COMMUNICATION SYSTEM, RADIO COMMUNICATION METHOD, AND BASE STATION FOR CONTROLLING A TRANSMISSION RATE OF UPLINK USER DATA

(75) Inventors: Yukiko Takagi, Yokosuka (JP); Akihito Hanaki, Yokohama (JP); Takahiro Hayashi, Yokosuka (JP); Junichiro Kawamoto, Tokyo (JP); Yoshikazu Goto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 738 days.

(21) Appl. No.: 12/388,678

(22) Filed: Feb. 19, 2009

(65) Prior Publication Data

US 2009/0225699 A1 Sep. 10, 2009

(30) Foreign Application Priority Data

Feb. 22, 2008 (JP) ............................ P2008-042084

(51) Int. Cl.
*H04W 4/00* (2009.01)
*H04W 72/00* (2009.01)

(52) U.S. Cl. .................... 370/328; 370/329; 455/450

(58) Field of Classification Search ................... 370/328
See application file for complete search history.

(56) References Cited

U.S. PATENT DOCUMENTS

| 6,411,602 | B2* | 6/2002 | Schoenblum et al. | 370/232 |
|---|---|---|---|---|
| 7,193,966 | B2* | 3/2007 | Gupta et al. | 370/231 |
| 7,295,514 | B2* | 11/2007 | Cha et al. | 370/230 |
| 7,454,173 | B2* | 11/2008 | Wiberg et al. | 455/69 |
| 7,505,448 | B2* | 3/2009 | Sheng et al. | 370/350 |
| 7,643,443 | B2* | 1/2010 | Maufer et al. | 370/328 |
| 7,746,816 | B2* | 6/2010 | Attar et al. | 370/318 |
| 7,813,754 | B2* | 10/2010 | Usuda et al. | 455/522 |
| 7,912,473 | B2* | 3/2011 | Fodor | 455/452.1 |
| 8,045,513 | B2* | 10/2011 | Kim et al. | 370/329 |

(Continued)

FOREIGN PATENT DOCUMENTS

JP 10-164017 A 6/1998

(Continued)

OTHER PUBLICATIONS

3GPP; "3GPP TS 25.321 V7.7.0 (Dec. 2007) 3rd Generation Partnership Project; Technical Specification Group Radio Access Network; Medium Access Control (MAC) protocol specification (Release 7)"; pp. 1-2, 41-77 (Dec. 2007) (Cited in the counterpart European search report).

(Continued)

*Primary Examiner* — Guang Li
(74) *Attorney, Agent, or Firm* — Marvin A. Motsenbocker; Mots Law, PLLC

(57) ABSTRACT

A base station includes: a determination unit that determines whether or not a total of an initial transmission rate and assigned transmission rates exceeds a maximum receiving transmission rate when the base station receives a communication start request from a radio terminal; a selecting unit that selects a decrease target terminal when the total of the initial transmission rate and the assigned transmission rates exceeds the maximum receiving transmission rate; and a transmitting unit that transmits transmission rate decrease data to the decrease target terminal, and the base station causes the total of the initial transmission rate and the assigned transmission rates to be equal to or less than the maximum receiving transmission rate by transmitting the transmission rate decrease data.

18 Claims, 6 Drawing Sheets

U.S. PATENT DOCUMENTS

| | | | |
|---|---|---|---|
| 2003/0007456 A1* | 1/2003 | Gupta et al. | 370/232 |
| 2003/0104831 A1* | 6/2003 | Razavilar et al. | 455/522 |
| 2004/0141479 A1* | 7/2004 | Cha et al. | 370/329 |
| 2005/0036449 A1* | 2/2005 | Ranta-Aho et al. | 370/235 |
| 2005/0073985 A1* | 4/2005 | Heo et al. | 370/342 |
| 2005/0249148 A1* | 11/2005 | Nakamata et al. | 370/328 |
| 2005/0250511 A1* | 11/2005 | Xiao et al. | 455/453 |
| 2006/0003787 A1* | 1/2006 | Heo et al. | 455/522 |
| 2006/0018277 A1* | 1/2006 | Petrovic et al. | 370/329 |
| 2006/0092876 A1* | 5/2006 | Kwak et al. | 370/329 |
| 2006/0105774 A1* | 5/2006 | Ranta-Aho et al. | 455/453 |
| 2006/0223567 A1* | 10/2006 | Kwak et al. | 455/522 |
| 2008/0212524 A1* | 9/2008 | Niwano | 370/329 |

FOREIGN PATENT DOCUMENTS

| | | |
|---|---|---|
| JP | 2000-224103 A | 8/2000 |
| JP | 2002-118515 A | 4/2002 |
| JP | 2003-348013 A | 12/2003 |
| JP | 2006-518173 A | 8/2006 |
| WO | 2004/075596 A | 9/2004 |

OTHER PUBLICATIONS

Lee J A et al.; "A Rate Control Algorithm for Uplink High-Speed Packet Data Transmission in UMTS" Signal Processing Advances in Wireless Communications; 2005 IEEE 6th Workshop; pp. 730-734 (2005) (Cited in the counterpart European search report).

Qualcomm Europe; "DRAFT CR to TS 25.321 [Rel-7] on Introducing 16QAM uplink support"; 3GPP; TSG-RAN WG2 Meeting #58 Kobe Japan; (May 7-11, 2007) (Cited in the counterpart European search report).

ETSI; ETSI TS 125 331 V8.1.0 (Jan. 2008) Universal Mobile Telecommunications System (UMTS); Radio Resource Control (RRC); Protocol specification (3GPP TS 25.331 version 8.1.0 Release 8); pp. 1-1467 (Jan. 2008) (Cited in the counterpart European search report).

3GPP TS 25.321 V7.5.0 (Jun. 2007), 3rd Generation Partnership Project; Technical Specification Group Radio Access Network; Medium Access Control (MAC) protocol specification, (Release 7), 78 pages.

* cited by examiner

RADIO COMMUNICATION SYSTEM, RADIO COMMUNICATION METHOD, AND BASE STATION FOR CONTROLLING A TRANSMISSION RATE OF UPLINK USER DATA

CROSS REFERENCE TO RELATED APPLICATION

This application is based upon and claims the benefit of priority from prior Japanese Patent Application No. 2008-042084, filed on Feb. 22, 2008; the entire contents of which are incorporated herein by reference.

BACKGROUND OF THE INVENTION

1. Field of the Invention

The present invention relates to a radio communication system in which first radio terminals transmit uplink user data to a base station through an enhanced dedicated physical data channel and the base station transmits, to the first radio terminals, transmission rate control data for controlling a transmission rate of the uplink user data, and also relates to a radio communication method and a base station.

2. Description of the Related Art

Heretofore, a radio communication system including a base station and a radio network controller has been known. In the radio communication system, the base station has a single or multiple cells, and a radio communication is performed between each of the cells and a plurality of radio terminals. The radio network controller controls a plurality of base stations, and assigns a radio resource to the plurality of the radio terminals. Note that such a technique (hereinafter referred to as first technique) is sometimes referred to as Release 99 (R99) and others.

For the purpose of improving the throughput and shortening the delay time, and others, there has recently been proposed a technique in which a base station assigns the radio resources for uplink user data transmitted from each of the radio terminals to the base station (network side). Note that such a technique (hereinafter referred to as a second technique) is sometimes referred to as the High Speed Uplink Packet Access (HSUPA), the Enhanced Uplink (EUL) and others.

Each of the cells functions as a serving cell or as a non-serving cell. A Transport Block Size (TBS) is determined based on the transmission rate (for example, a Serving Grant (SG)) of the uplink user data, and is controlled by transmission rate control data transmitted from the serving cell and the non-serving call. The transmission rate control data includes Absolute Grant (AG) for directly indicating the transmission rate and Relative Grant (RG) for relatively indicating the transmission rate (for example, see 3GPP TS25.321 Ver. 7.5.0).

Here, the uplink user data is transmitted to the base station from the radio terminals through an Enhanced Dedicated Physical Data Channel (E-DPDCH). The absolute transmission rate control data (AG) is transmitted from the radio base station to the radio terminals through an E-DCH Absolute Grant Channel (E-AGCH). The relative transmission rate control data (RG) is transmitted from the radio base station to the radio terminals through an E-DCH Relative Grant Channel (E-RGCH).

The serving cell transmits the absolute transmission rate control data (AG) and the relative transmission rate control data (RG) to the radio terminals. Meanwhile, the non-serving cell transmits, to the radio terminals, only the relative transmission rate control data (RG) without transmitting the absolute transmission rate control data (AG).

Meanwhile, the base station has the upper limit of the radio resource (maximum radio resource) assignable to the radio terminal. Here, the maximum radio resource is a total of transmission rates assignable to the radio terminal by the base station (maximum receiving transmission rate).

In the above-described second technique, the base station can transmit the absolute transmission rate control data (AG) or the relative transmission rate control data (RG) at each TTI (Transmission Time Interval). In other words, the transmission rate assigned to the radio terminal is variable at each TTI.

Accordingly, in a case where the base station receives a communication start request from a new radio terminal in a certain TTI when a total of transmission rates having already assigned to the radio terminals in a TTI is close to the maximum receiving transmission rate, the base station is not capable of assigning a transmission rate to the new radio terminal.

For example, assume a case where a transmission rate assigned to a single radio terminal is high in a certain TTI. In this case, the transmission rate for uplink user data transmitted by the single radio terminal is maintained, but a new communication start request received in the certain TTI is rejected.

As described above, when a transmission rate is assigned to a radio terminal in each TTI without considering a new communication start request, the number of radio terminals communicable with the base station is likely decreased.

SUMMARY OF THE INVENTION

A first aspect of the present invention is summarized as a radio communication system in which first radio terminals transmit uplink user data to a base station through an enhanced dedicated physical data channel and the base station transmits, to the first radio terminals, transmission rate control data for controlling a transmission rate of the uplink user data. The base station includes: a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals; a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate. The base station causes the total of the initial transmission rate and the assigned transmission rates to be equal to or less than the maximum receiving transmission rate by transmitting the transmission rate decrease data.

In the first aspect of the present invention, the selecting unit selects a first radio terminal of which the transmission rate exceeds a minimum transmission rate, as the decrease target terminal from among the first radio terminals, the minimum transmission rate being the transmission rate at least to be assigned to each of the first radio terminals.

In the first aspect of the present invention, each of the first radio terminals includes a terminal side transmitting unit configured to transmit information indicating a buffer amount to the base station, the buffer amount being an amount of the uplink user data accumulated in a transmission buffer provided in each of the first radio terminals. The selecting unit preferentially selects a first radio terminal of which the buffer amount is small, as the decrease target terminal from among the first radio terminals.

In the first aspect of the present invention, each of the first radio terminals includes a terminal side transmitting unit configured to transmit happiness information to the base station, the happiness information indicating whether or not the transmission rate assigned to each of the first radio terminals is sufficient. The selecting unit preferentially selects a first radio terminal having a high rate of the Happiness information indicating that the transmission rate is sufficient, as the decrease target terminal from among the first radio terminals.

In the first aspect of the present invention, the transmission rate is determined based on a ratio of transmission power of the enhanced dedicated physical data channel to the transmission power of a dedicated physical control channel. Each of the first radio terminals includes a terminal side transmitting unit configured to transmit information indicating a transmission power ratio to the base station, the transmission power ratio being a ratio of maximum transmission power allowed for each of the first radio terminals to transmission power of the dedicated physical control channel. The selecting unit preferentially selects a first radio terminal of which the transmission power ratio is low, as the decrease target terminal from among the first radio terminals.

In the first aspect of the present invention, each of the first radio terminals has a predetermined priority class. The selecting unit preferentially selects a first radio terminal of which priority class is low, as the decrease target terminal from among the first radio terminals.

In the first aspect of the present invention, the transmission rate is determined based on a ratio of transmission power of the enhanced dedicated physical data channel to the transmission power of a dedicated physical control channel. The selecting unit preferentially selects a first radio terminal of which the transmission rate is high, as the decrease target terminal from among the first radio terminals.

A second aspect of the present invention is summarized as a radio communication method by which first radio terminals transmit uplink user data to a base station through an enhanced dedicated physical data channel and the base station transmits, to the first radio terminals, transmission rate control data for controlling a transmission rate of the uplink user data. The radio communication method includes: (A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals; (B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and (C) causing the base station to transmit transmission rate decrease data to the decrease target terminal, the transmission rate decrease data being the transmission rate control data for giving an instruction to decrease the transmission rate. The base station causes the total of the initial transmission rate and the assigned transmission rates to be equal to or less than the maximum receiving transmission rate by transmitting the transmission rate decrease data.

A third aspect of the present invention is summarized as a base station which receives uplink user data from first radio terminals through an enhanced dedicated physical data channel and transmits, to the first radio terminals, transmission rate control data for controlling a transmission rate of the uplink user data. The base station includes: a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals; a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate. The base station causes the total of the initial transmission rate and the assigned transmission rates to be equal to or less than the maximum receiving transmission rate by transmitting the transmission rate decrease data.

DETAILED DESCRIPTION OF THE EMBODIMENTS

Figure 1:
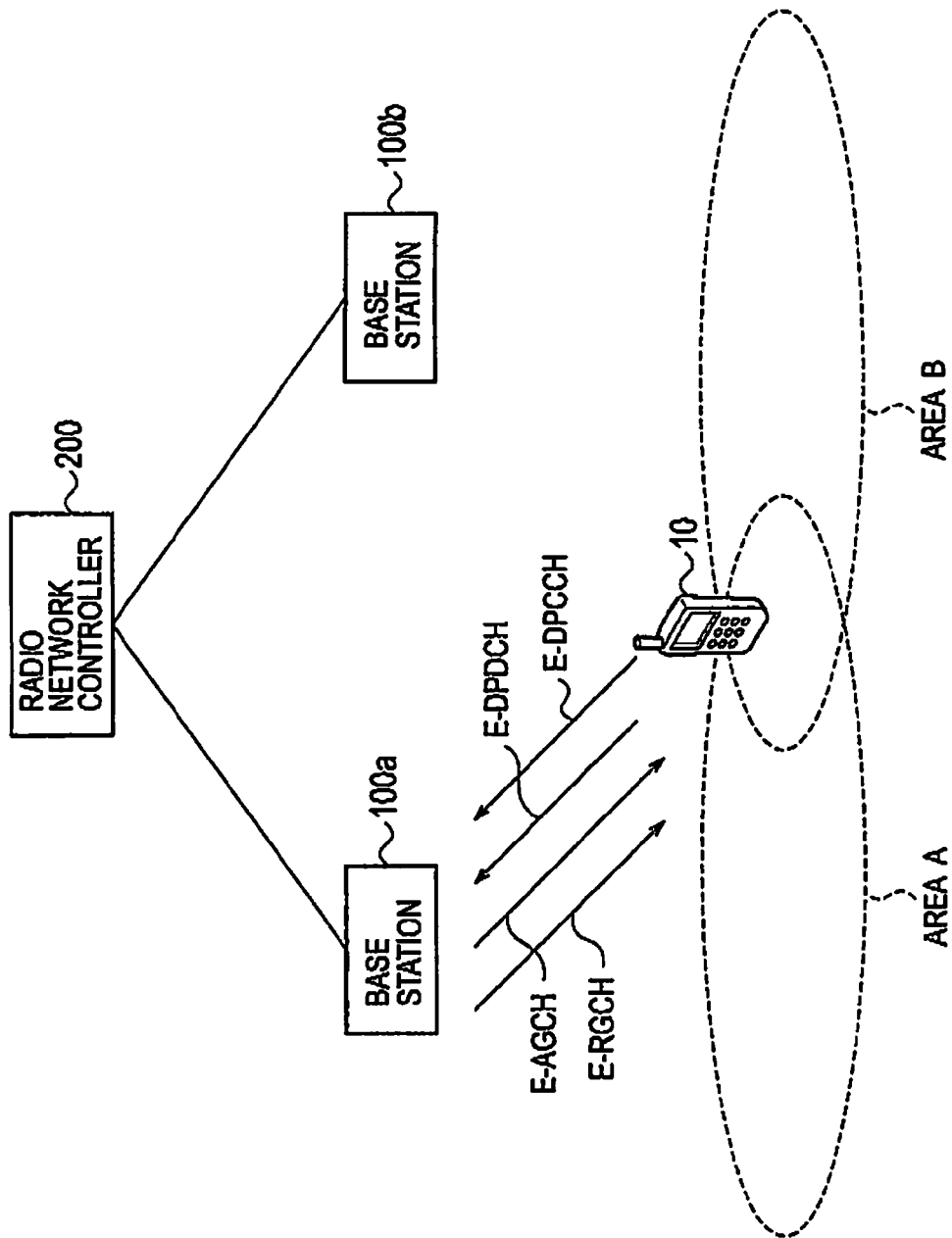
FIG. 1 is a view showing a radio communication system according to a first embodiment.

The configuration of a radio communication system according to an embodiment of the present invention will be described below by referring to the drawings. In the following description of the drawings, the same or similar reference numerals will be given to denote the same or similar portions.

However, it should be noted that the drawings are schematic and ratios of dimensions and others are different from actual ones. Therefore, specific dimensions and others should be determined by taking into consideration the following description. Moreover, as a matter of course, also among the drawings, there are included portions in which dimensional relationships and ratios are different from each other.

[First Embodiment]

(Configuration of Radio Communication System)

The configuration of a radio communication system according to a first embodiment will be described below by referring to the drawings. FIG. 1 is a view showing a radio communication system according to the first embodiment.

As shown in FIG. 1, the radio communication system has a radio terminal 10, a base station 100 (base station 100a or base station 100b), and a radio network controller 200. Note that FIG. 1 shows the case in which the radio terminal 10 communicates with the base station 100a.

The radio terminal 10 transmits uplink user data to the base station 100a. Specifically, the radio terminal 10 transmits the uplink user data to the base station 100a through a Dedicated Physical Data Channel (DPDCH) in a framework in which the radio network controller 200 performs radio resource assignment and others. The framework in which the radio network controller 200 performs radio resource assignment and others is sometimes referred to as Release 99 (R99) and others.

The radio terminal 10 transmits uplink control data to the base station 100a through a Dedicated Physical Control Channel (DPCCH) in a framework in which a radio network controller 200 performs radio resource assignment and others.

Note that transmission power of DPCCH is controlled by a TPC command which the radio terminal 10 receives from the base station 100, as in the case of general closed-loop power control. The TPC command is a command generated by the base station 100 by comparing a receiving quality of an uplink signal with a target quality thereof.

Meanwhile, the radio terminal 10 transmits uplink user data to the base station 100a through an Enhanced Dedicated Physical Data Channel (E-DPDCH) in a framework in which the base station 100 performs radio resource assignment and others. The framework in which the base station 100 performs radio resource assignment and others is sometimes referred to as High Speed Uplink Packet Access (HSUPA), Enhanced Uplink (EUL) and others.

Here, the uplink user data is divided into blocks for each Transmission Time Interval (TTI), that is, for each process (HARQ process). Each of the blocks is transmitted by use of a process (hereinafter referred to as an active process) which is assigned to the radio terminal 10.

Moreover, the predetermined number of processes (process #1 to process #n) constitutes one cycle (HARQ RTT) and is repeated for each cycle. Note that the number of processes included in one cycle is set according to a TTI length. For example, when the TTI length is 2 ms, the number of processes included in one cycle is "8". For example, when the TTI length is 10 ms, the number of processes included in one cycle is "4".

Here, the radio terminal 10 has a table for associating a transmission power ratio with the transmission rate for the uplink user data transmitted through the E-DPDCH. The transmission power ratio is a ratio of transmission power of the E-DPDCH to transmission power of the DPCCH (E-DPDCH/DPCCH). The transmission rate is represented by Transport Block Size (TBS).

The transmission power ratio assigned to the radio terminal 10 will be hereinafter referred to as a Serving Grant (SG). Note that the transmission power ratio and the transmission rate are associated one-to-one with each other.

Thus, the Serving Grant (SG) may be considered not only as a term representing the transmission power ratio assigned to the radio terminal 10 but also as a term representing the transmission rate assigned to the radio terminal 10.

Note that, as will be described later, the radio terminal 10 updates the SG according to transmission rate control data (AG or RG) which is received from the base station 100a (see, 3GPP TS25.321 Ver.7.5.0 11.8.1.3 "Serving Grant Update"). Subsequently, the radio terminal 10 determines a transmission rate (that is, TBS) corresponding to the SG by referring to the table for associating the transmission power ratio with the transmission rate (see, 3GPP TS25.321 Ver.7.5.0 11.8.1.4 "E-TFC Selection").

The radio terminal 10 transmits uplink control data to the base station 100a through an Enhanced Dedicated Physical Control Channel (E-DPCCH) and others in a framework in which the base station 100 performs radio resource assignment and others. The uplink control data includes uplink control data (UL Scheduling Information) and others which the base station 100a refers in radio resource assignment.

The uplink control data includes "Highest priority Logical Channel ID (HLID)", "Total E-DCH Buffer Status (TEBS)", "Highest priority Logical Channel Buffer Status (HLBS)", "User Power Headroom (UPH)", "Happy Bit" and others (see, 3GPP TS25.321 Ver.7.5.0 9.2.5.3 "UL Scheduling Information").

The "HLID" is an identifier for identifying a highest priority logical channel among logical channels for transporting the uplink user data.

The "TEBS" is information indicating an amount (buffer amount) of the uplink user data accumulated in a transmission buffer provided in the radio terminal 10.

The "HLBS" is an amount (buffer amount) of uplink user data corresponding to the logical channel identified by the HLID among the uplink user data accumulated in the transmission buffer provided in the radio terminal 10.

The "UPH" is a transmission power ratio that is a ratio of Maximum UE Transmission Power to transmission power of the DPCCH. The Maximum UE Transmission Power is a maximum transmission power allowed for the radio terminal 10. For example, the UPH is represented by "maximum transmission power"/"transmission power of DPCCH".

The "Happy Bit" is happiness information indicating whether or not the SG assigned to the radio terminal 10 is sufficient As the "Happy Bit", "Happy" indicates that the SG assigned to the radio terminal 10 itself is sufficient and "Unhappy" indicates that the SG assigned to the radio terminal 10 itself is insufficient. Note that "Happy Bit" is expressed by one bit.

Note that the radio terminal 10 may transmit "Happy Bit" to the base station 100 at a timing different from that of the scheduling information including the above described various pieces of information ("HLID", "TEBS", "HLBS", and "UPH").

Figure 2:
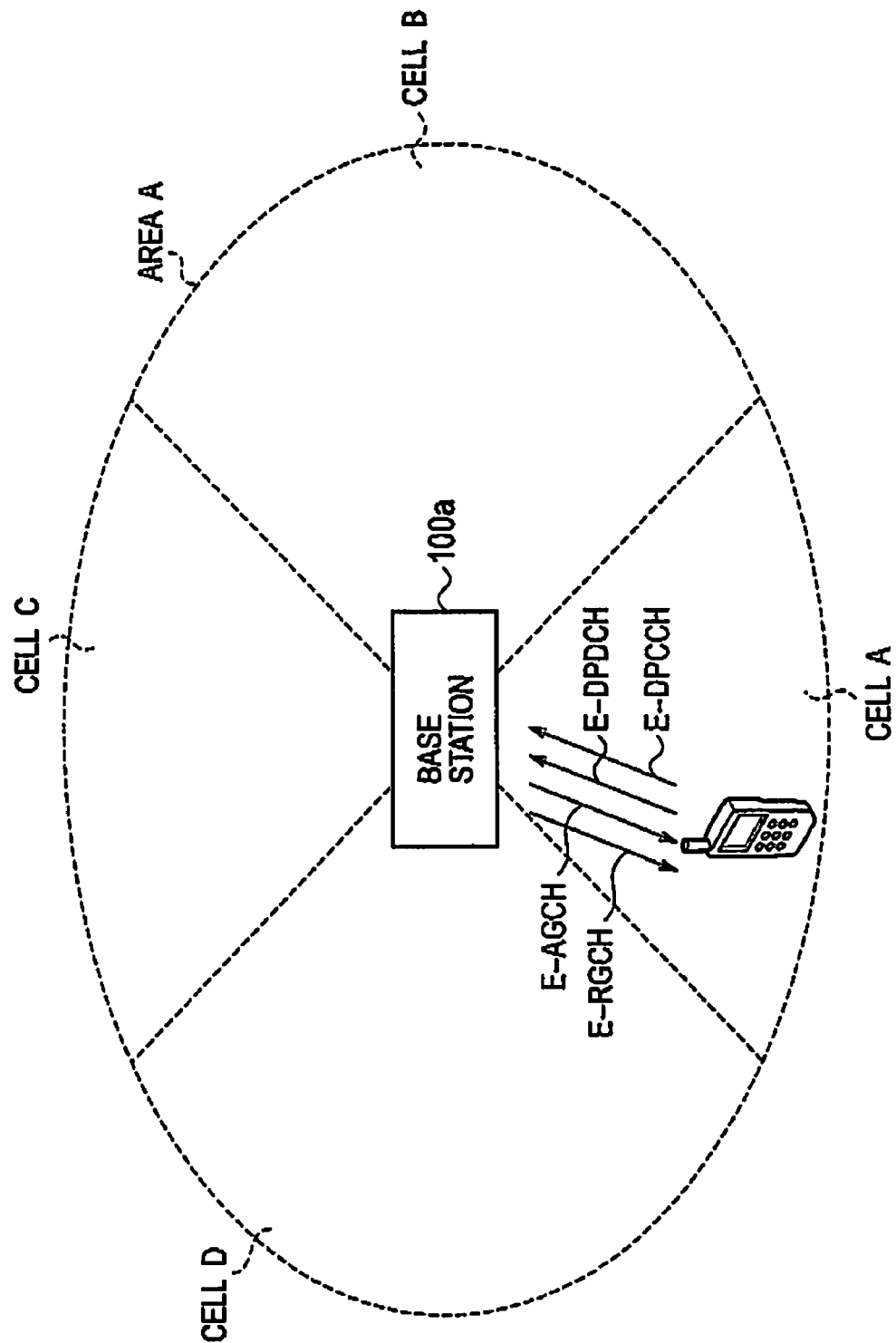
FIG. 2 is a view showing the radio communication system according to the first embodiment.

The base station 100a, as shown in FIG. 2, has multiple cells (calls A to D), and each of the cells communicates with the radio terminal 10 located within their own cells. Each of the cells functions as a serving cell in some cases and as a non-serving cell in other cases.

Note that the "cell" is basically used as a term representing a function for communicating with the radio terminal 10. Note also that, the "cell" is sometimes used as a term representing an area in which the radio terminal 10 is located.

For example, in FIG. 2, considered is a case where the radio terminal 10 executes communications according to an instruction of an EUL scheduler provided in the cell A (that is, a case where communications are executed according to AG received from the cell A through E-AGCH). In this case, the cell A is a serving cell for the radio terminal 10 and the cells B to D are non-serving cells for the radio terminal 10. On the other hand, the radio terminal 10 is a serving terminal for the cell A and a non-serving terminal for the calls B to D.

The base station 100 receives the uplink user data from the radio terminal 10 through a data channel, such as DPDCH or E-DPDCH. On the other hand, the base station 100 transmits, to the radio terminal 10, transmission rate control data for controlling a transmission rate of the uplink user data which is transmitted through E-DPDCH. The transmission rate control data includes an absolute transmission rate control data (Absolute Grant; AG) for directly indicating the transmission rate and a relative transmission rate control data (Relative Grant; RG) for relatively indicating the transmission rate.

The absolute transmission rate control data (AG) is data (Index) which directly indicates the transmission power ratio (E-DPDCH/DPCCH) assigned to the radio terminal 10 (see, 3GPP TS25.212 Ver.7.5.0 4.10.1A.1 "Information field mapping of the Absolute Grant Value").

As described above, the absolute transmission rate control data (AG) is a command which directly indicates a value of the transmission rate without depending on the current transmission rate.

The relative transmission rate control data (RG) is data ("Up", "Down", or "Hold") which relatively indicates the transmission power ratio (E-DPDCH/DPCCH) assigned to the radio terminal 10 (see, 3GPP TS25.321 Ver.7.5.0 9.2.5.2.1 "Relative Grants").

As described above, the relative transmission rate control data (RG) is a command relatively controlling the current transmission rate. Specifically, the relative transmission rate control data includes an increase command "Up" instructing an increase of the current transmission rate, a maintenance command "Hold" instructing maintenance of the current transmission rate, and a decrease command "Down" instructing a decrease of the current transmission rate. Note that the increase command is a command instructing an increase of the transmission rate by a predetermined increase range and the decrease command is a command instructing a decrease of the transmission rate by a predetermined decrease range. The predetermined increase range may have the same range as the predetermined decrease range or may have smaller range than the predetermined decrease range.

The base station 100a transmits the AG to the radio terminal 10 through an E-DCH Absolute Grant Channel (E-AGCH). The base station 100a transmits the RG to the radio terminal 10 through an E-DCH Relative Grant Channel (E-RGCH).

For example, the serving cell (here, cell A) transmits, to the radio terminal 10, the AG through the E-AGCH and the RG through the E-RGCH. On the other hand, the non-serving cell (here, cell B) transmits the RG to the radio terminal 10 through the E-RGCH without transmitting the AG to the radio terminal through the E-AGCH.

Note that, in FIGS. 1 and 2, channels used for R99 (such as DPDCH and DPCCH) are not shown for simplifying the description, and a number of radio terminals 10 are present in each cell in practice.

Note that the cell that the radio terminal 10 uses as a serving cell is not limited to one cell but may be multiple cells.

Note that, in the EUL, the transmission rate assigned to the radio terminal 10 is controlled by the transmission rate control data (AG or RG) for each TTI. Meanwhile, in R99, the transmission rate assigned to the radio terminal 10 can be controlled only by a period longer than 1 TTI.

(Configuration of Radio Terminal)

Figure 3:
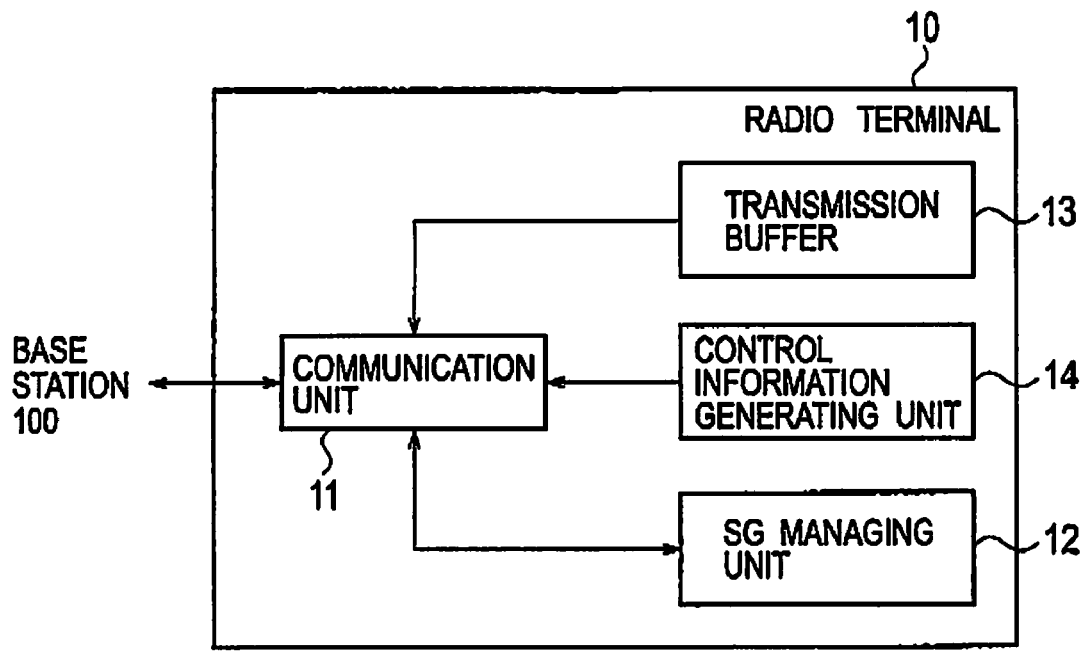
FIG. 3 is a block diagram showing a radio terminal 10 according to the first embodiment.

The configuration of the radio terminal according to the first embodiment will be described below by referring to the drawings. FIG. 3 is a block diagram showing the radio terminal 10 according to the first embodiment.

As shown in FIG. 3, the radio terminal 10 includes a communication unit 11, an SG managing unit 12, a transmission buffer 13, and a control information generating unit 14.

The communication unit 11 communicates with the base station 100. Specifically, the communication unit 11 transmits uplink user data to the base station 100 through the E-DPDCH. The communication unit 11 transmits uplink control data (for example, the UL scheduling information described above) to the base station 100 through the E-DPCCH. Meanwhile, the communication unit 11 receives, from the base station 100, transmission rate control data (AG or RG described above) for controlling a transmission rate of the uplink user data.

The SG managing unit 12 manages an SG assigned for the uplink user data. The SG managing unit 12 has a table for associating a transmission power ratio (SG) with a transmission rate (TBS).

As described above, the SG managed by the SG managing unit 12 is controlled by the AG or the RG received from the base station 100. The transmission rate of the uplink user data is selected within a range that does not exceed the TBS associated with the SG.

The transmission buffer 13 is a buffer for accumulating the uplink user data. The communication unit 11 described above transmits the uplink user data accumulated in the transmission buffer 13.

The control information generating unit 14 generates uplink control data which is used by the base station 100a in radio resource assignment As described above, the uplink control data includes "HLID", "TEBS", "HLBS", "UPH", "Happy Bit", and others. As a matter of course, the control information generating unit 14 generates the uplink control data after acquiring "HLID", "TEBS", "HLBS", "UPH", "Happy Bit" and others. Note that the control information generating unit 14 may generate "Happy Bit" separately from the scheduling information including "HLID", "TESS", "HLBS" and "UPH".

(Configuration of Base Station)

Figure 4:
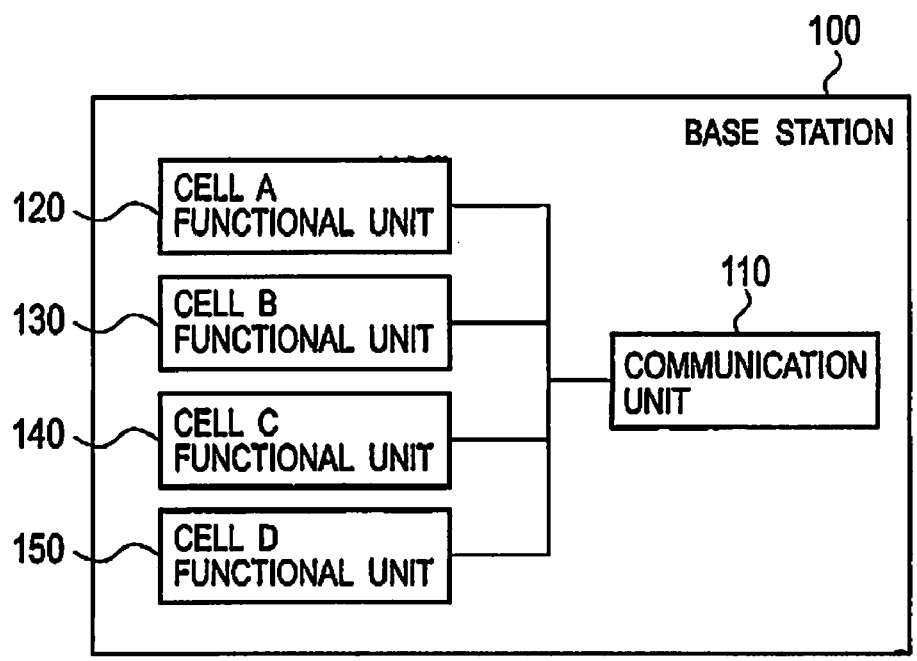
FIG. 4 is a block diagram showing a base station 100 according to the first embodiment.

The configuration of the base station according to the first embodiment will be described below by referring to the drawings. FIG. 4 is a block diagram showing the radio base station 100 according to the first embodiment.

As shown in FIG. 4, the base station 100 has a communication unit 110, a cell A functional unit 120, a cell B functional unit 130, a cell C functional unit 140, and a cell D functional unit 150.

The communication unit 110 communicates with the radio terminals 10 located in the cells A to D. Specifically, the communication unit 110 receives the uplink user data from each of the radio terminals 10 through the data channel, such as the DPDCH or the E-DPDCH. The communication unit 110 receives uplink control data from the radio terminal 10 through the control channel, such as the DPCCH or the E-DPCCH. Meanwhile, the communication unit 110 transmits transmission rate control data (AG or RG) to the radio terminal 10 through the control channel, such as the E-AGCH and the E-RGCH.

Here, it should be noted that the communication unit 110 receives a communication start request from a new radio terminal 10 (a second radio terminal). The new radio terminal 10 may be a radio terminal which is to start a new communication in a framework (R99) in which a radio network controller 200 assigns a radio resource. The new radio terminal 10 may be a radio terminal which is to start a new communication in a framework (EUL) in which the base station 100 assigns a radio resource.

Note that the new radio terminal 10 (second radio terminal) may be a radio terminal which has already been in communication with the base station 100. Such a case includes a case where the radio terminal 10 having already been in communication with the base station 100 is to a new start communication.

Note that the communication unit 110 also communicates with an upper station (such as a radio network controller or a switching system) which manages the base station 100.

The cell A functional unit 120 functions as a serving cell for the radio terminal 10 located in the cell A. Meanwhile, the cell A functional unit 120 functions as a non-serving cell for the radio terminals 10 located in the cells B to D.

The cell B functional unit 130 functions as a serving cell for the radio terminal 10 located in the cell B. Meanwhile, the cell B functional unit 130 functions as a non-serving cell for the radio terminals 10 located in the cells A, C and D.

The cell C functional unit 140 functions as a serving cell for the radio terminal 10 located in the cell C. Meanwhile, the cell C functional unit 140 functions as a non-serving cell for the radio terminals 10 located in the cells A, B and D.

The cell D functional unit 150 functions as a serving cell for the radio terminal 10 located in the cell D. Meanwhile, the cell D functional unit 150 functions as a non-serving cell for the radio terminals 10 located in the cells A to C.

(Cell Configuration)

Figure 5:
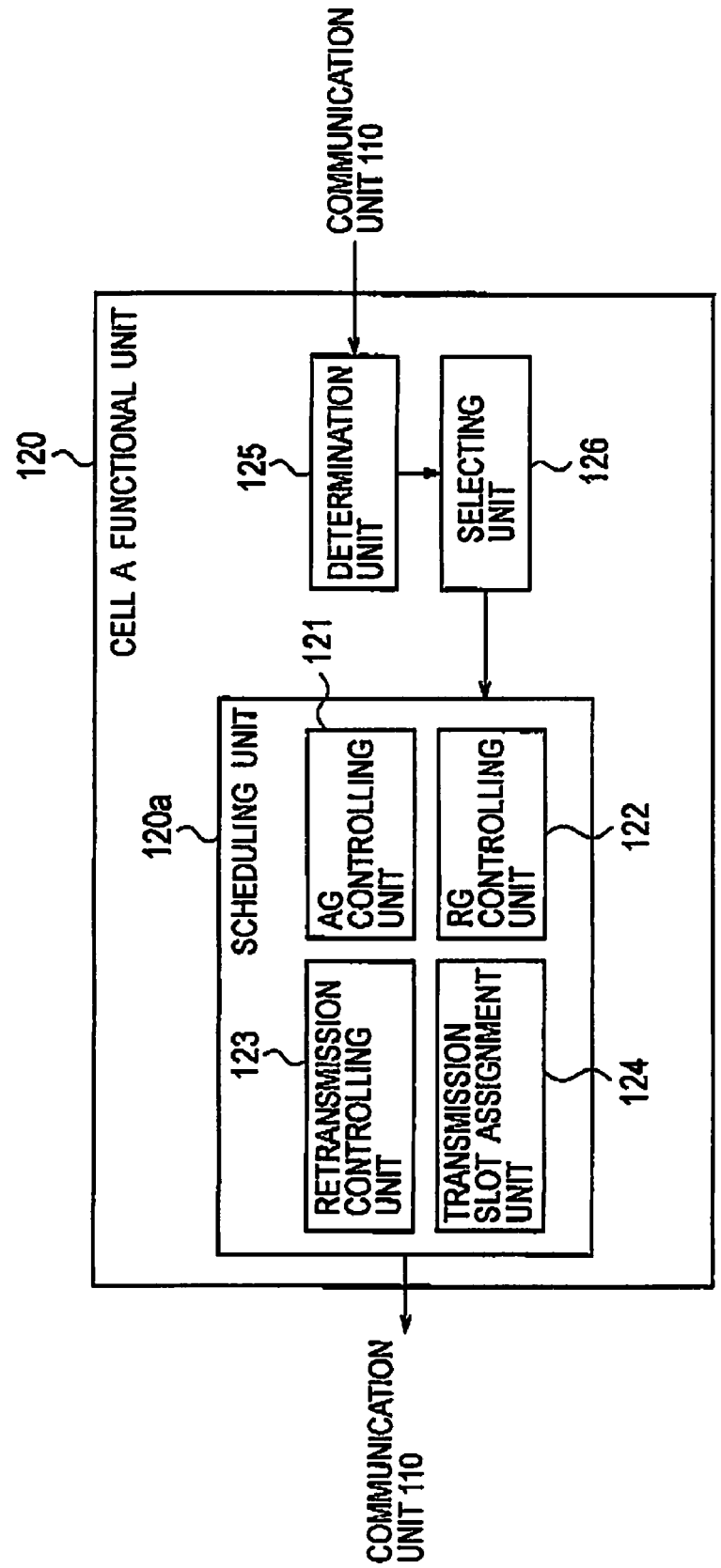
FIG. 5 is a block diagram showing a cell A functional unit 120 according to the first embodiment.

The configuration of a cell according to the first embodiment will be described below by referring to the drawings. FIG. 5 is a block diagram showing the cell (cell A functional unit 120) according to the first embodiment. Here, the description will be given of, for example, the case where the cell A functional unit 120 functions as a serving cell.

As shown in FIG. 5, the cell A functional unit 120 has a scheduling unit 120a assigning a radio resource to the radio terminal 10 using the cell A as a serving cell, a determination unit 125, and a selecting unit 126.

The scheduling unit 120a has an AG controlling unit 121, an RG controlling unit 122, a retransmission controlling unit 123, and a transmission slot assignment unit 124. The scheduling unit 120a operates in a media access control enhanced (MAC-e) layer The AG controlling unit 121 transmits the AG, through the E-AGCH, to the radio terminal 10 (serving terminal) using the cell A as a serving cell. Note that the AG is a command to directly indicate a transmission rate value without depending on the current transmission rate.

The RG controlling unit 122 transmits the RG, through the E-RGCH, to the radio terminal 10 (serving terminal) using the cell A as a serving cell. Note that the RG includes an increase command "Up", a maintenance command "Hold", and a decrease command "Down". As described above, the increase command "Up" is a command instructing an increase by a predetermined increase range and the decrease command "Down" is a command instructing a decrease by a predetermined decrease range.

Note that the AG controlling unit 121 and the RG controlling unit 122 control the SG to be assigned to the radio terminal 10 by referring to the uplink control data received from the radio terminal 10.

The retransmission controlling unit 123 determines for each block (each process) whether or not an error is caused in the uplink user data. Subsequently, the retransmission controlling unit 123 requests the radio terminal 10 to retransmit the block with the error (hereinafter, referred to as an error block). The retransmission control technique is a Hybrid Automatic Repeat Request (HARQ) technique, that combines a block which is firstly transmitted from the radio terminal 10 (hereinafter, referred to as a transmission block) and a block which is retransmitted from the radio terminal 10 (hereinafter, referred to as a retransmission block).

The transmission slot assignment unit 124 assigns, to the radio terminal 10, a transmission slot (that is, processes included in one cycle) used for transmission of the uplink user data (block) to be transmitted through the E-DPDCH. Note that the radio terminal 10 transmits the transmission block or the retransmission block to the base station 100 using the process (active process) assigned by the transmission slot assignment unit 124.

The determination unit 125 determines whether or not a total of an initial transmission rate and assigned transmission rates exceeds a maximum receiving transmission rate when the base station receives a communication start request from a new radio terminal 10 (second radio terminal).

The initial transmission rate is a transmission rate to be firstly assigned to the new radio terminal 10 (second radio terminal). The assigned transmission rate is a transmission rate already assigned by the base station 100 (here, the cell A). Note that the assigned transmission rate includes a transmission rate assigned to a radio terminal 10 communicating in the R99, and a transmission rate assigned to a radio terminal 10 communicating in the EUL.

A maximum receiving transmission rate is a total of transmission rates that the base station 100 (here, the cell A) can assign to the radio terminals 10. The maximum receiving transmission rate may be considered as an upper limit (maximum radio resource) of a radio resource assignable to the radio terminals 10.

The selecting unit 126 selects a radio terminal 10 (a decrease target terminal) for which a transmission rate is to be decreased, from among radio terminals 10 (first radio terminals) communicating with the base station 100 in the EUL when a total of the initial transmission rate and the assigned transmission rates exceeds the maximum receiving transmission rate. The first radio terminals 10 are, herein, serving terminals using the cell A as a serving cell.

Here, the selecting unit 126 selects a radio terminal 10 of which a transmission rate has exceeded a minimum transmission rate, from among radio terminals 10 (first radio terminals) communicating with the base station 100 in the EUL. In other words, the selecting unit 126 excludes any radio terminal 10 communicating at a minimum transmission rate, from candidates of the decrease target terminals. Note that the minimum transmission rate is a transmission rate at least to be assigned to the radio terminal 10.

Here, the scheduling unit 120a transmits transmission rate control data (transmission rate decrease data) for giving an instruction to decrease an SG, to a radio terminal 10 (a decrease target terminal) selected by the selecting unit 126.

For example, the AG controlling unit 121 transmits an AG for specifying a smaller SG than the SG assigned to a radio terminal 10 (the current SG), to the radio terminal 10 as transmission rate decrease data. At this time, the AG may be data for specifying a specific value (SG) smaller than the current SG, or for specifying a value (SG) decreased from the current SG by a predetermined value.

The RG controlling unit 122 may transmit an RG (decrease command "Down") for giving an instruction to decrease the SG, to a radio terminal 10 as transmission rate decrease data.

In this manner, the scheduling unit 120a transmits transmission rate decrease data to the radio terminal 10 (decrease target terminal) selected by the selecting unit 126, and thereby a total of the initial transmission rate and the assigned transmission rates is made equal to or lower than the maximum receiving transmission rate.

Specifically, the scheduling unit 120a calculates an amount of decrease of assigned transmission rate, that is, an amount of SG decrease caused by transmission of transmission rate decrease data so that the assigned transmission rate becomes equal to or lower than a transmission rate obtained by subtracting the initial transmission rate from the maximum receiving transmission rate.

In addition, the transmission rate decrease data may be transmitted to a plurality of radio terminals 10. In other words, the selecting unit 126 may select the plurality of radio terminals 10 as decrease target terminals.

(One Example of Transmission Rate Control)

Figure 6:
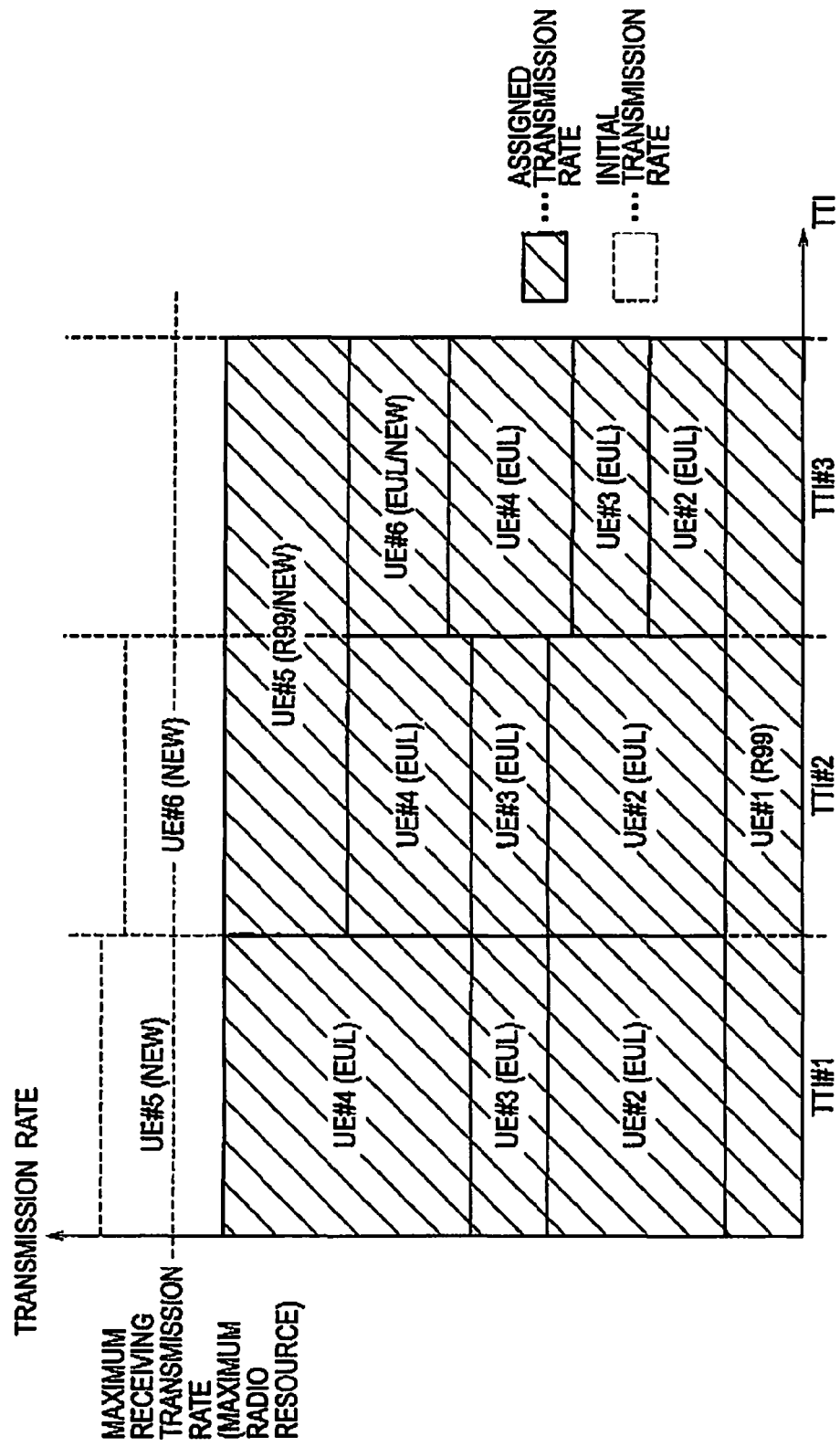
FIG. 6 is a view showing one example of transmission rate control according to the first embodiment.

One example of transmission rate control according to the first embodiment will be described below. FIG. 6 is a view showing one example of the transmission rate control according to the first embodiment.

As shown in FIG. 6, at TTI #1, radio terminals UE#1 to UE#4 are in communication with the base station 100. The radio terminal UE#1 is a radio terminal 10 performing communications in the R99. The radio terminals UE#2 to UE#4 are radio terminals 10 performing communications in the EUL.

Here, considered is the case where a communication start request is received from the radio terminal UE#5 at TTI #1. The radio terminal UE#5 is a radio terminal 10 which is to start communications anew in the R99.

In such a case, when an initial transmission rate is assigned to the radio terminal UE#5, the total of transmission rates to be assigned to the radio terminals UE#1 to UE#5 (the total of the initial transmission rate and the assigned transmission rate) exceeds the maximum receiving transmission rate.

Accordingly, the base station 100 transmits the transmission rate decrease data (AG or RG) to any one of the radio terminals UE#1 to UE#4 to decrease the assigned transmission rate.

Here, the base station 100 selects the radio terminal UE#4 as a decrease target terminal, and, thereafter, transmits the transmission rate decrease data to the radio terminal UE#4.

Note that the transmission rate of the radio terminal UE#1 cannot be controlled for every TTI because the radio terminal UE#1 performs communications in the R99. Accordingly, the radio terminal UE#1 is excluded from a candidate for the decrease target terminal. In addition, having the minimum transmission rate, the radio terminal UE#3 is excluded from a candidate for the decrease target terminal.

As a result, at TTI #2, the total of the transmission rates assigned to the radio terminals UE#1 to UE#5 (the total of the initial transmission rate and the assigned transmission rate) does not exceed the maximum receiving transmission rate even if the initial transmission rate is assigned to the radio terminal UE#5.

Subsequently, considered is the case where a communication start request is received from the radio terminal UE#6 at TTI #2. The radio terminal UE#6 is a radio terminal 10 which is to start communications in the EUL.

In such a case, when the initial transmission rate is assigned to the radio terminal UE#6, the total of the transmission rates assigned to the radio terminals UE#1 to UE#6 (the total of the initial transmission rate and the assigned transmission rate) exceeds the maximum receiving transmission rate.

Accordingly, the base station 100 transmits transmission rate decrease data (AG or RG) to any one of the radio terminals UE#1 to UE#5 to decrease the assigned transmission rate.

Here, the base station 100 selects the radio terminals UE#2 and UE#4 30 as decrease target terminals, and, thereafter, transmits the transmission rate decrease data to the radio terminals UE#2 and UE#4.

Note that the transmission rates of the radio terminals UE#1 and UE#5 cannot be controlled for every TTI because the radio terminals UE#1 and UE#5 perform communications in the R99. Accordingly, the radio terminals UE#1 and UE#5 are excluded from candidates for the decrease target terminal. In addition, having the minimum transmission rate, the radio terminal UE#3 is excluded from a candidate for the decrease target terminal.

As a result, at TTI#3, the total of the transmission rates assigned to the radio terminals UE#1 to UE#6 (the total of the initial transmission rate and the assigned transmission rate) does not exceed the maximum receiving transmission rate even if the initial transmission rate is assigned to the radio terminal UE#6.

(Operations of Base Station (Cell))

Figure 7:
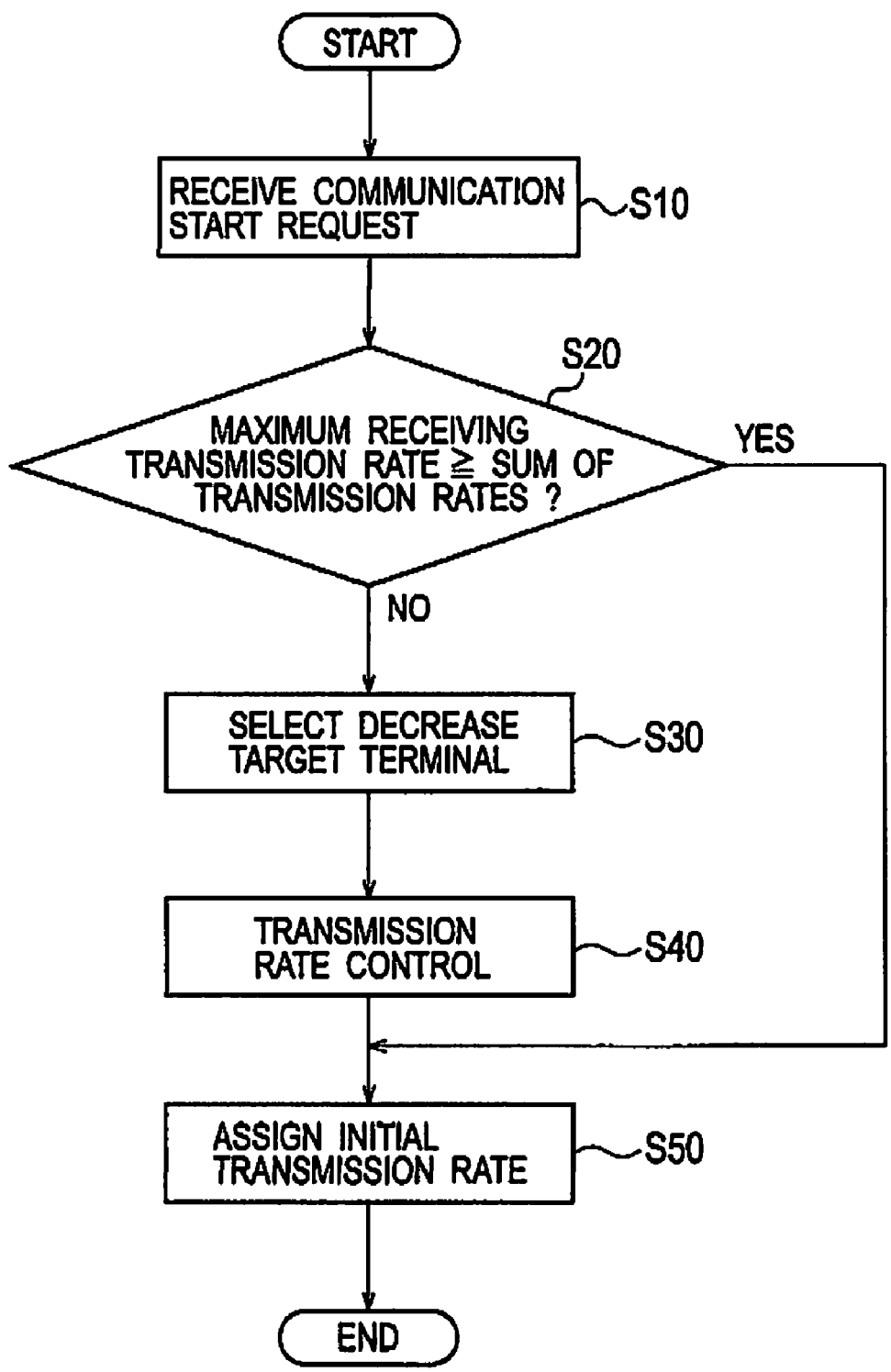
FIG. 7 is a flowchart showing an operation of the base station 100 (cell) according to the first embodiment.

Operation of a base station (a cell) of the first embodiment is described below with reference to drawings. FIG. 7 is a flowchart showing operation of a base station 100 (a cell) of the first embodiment.

As shown in FIG. 7, in Step S10, the base station 100 receives a communication start request from a new radio terminal 10 (second radio terminal).

In Step S20, the base station 100 determines whether or not a total of an initial transmission rate and assigned transmission rates exceeds a maximum receiving transmission rate.

As described above, the initial transmission rate is a transmission rate to be firstly assigned to the new radio terminal 10 (second radio terminal). The assigned transmission rate is a transmission rate already assigned by the base station 100.

In Step S30, the base station 100 selects a radio terminal 10 (a decrease target terminal) for which a transmission rate is decreased, from among radio terminals 10 (first radio terminals) communicating with the base station 100 in the EUL.

As described above, the base station 100 excludes a radio terminal 10 of which a transmission rate is a minimum transmission rate, from candidates of the decrease target terminals.

In Step S40, the base station 100 transmits transmission rate control data (transmission rate decrease data) for giving an instruction to decrease the SG, to a radio terminal 10 (a decrease target terminal) selected in Step S30.

As described above, the transmission rate decrease data is transmitted, and thereby the base station 100 causes a total of the initial transmission rate and the assigned transmission rates to be equal to or lower than the maximum receiving transmission rate.

In Step S50, the base station 100 assigns an initial transmission rate to the new radio terminal 10 (second radio terminal).

(Operations and Effects)

In the first embodiment, when a total of the initial transmission rate and the assigned transmission rates exceeds the maximum receiving transmission rate, the base station 100 transmits transmission rate decrease data to a decrease target terminal selected from among radio terminals 10 communicating with the base station 100 in the EUL.

Therefore, an initial transmission rate can be assigned to the new radio terminal 10 in response to a communication start request received from the new radio terminal 10. As a result, the number of radio terminals 10 communicable with the base station 100 can be increased.

[Second Embodiment]

Next, a second embodiment is described. Differences between the first embodiment and the second embodiment are mainly described below. In the second embodiment a method of selecting a decrease target terminal is different from a method of the first embodiment.

Specifically, the selecting unit 126 selects a decrease target terminal from among radio terminals 10 communicating with the base station 100 in the EUL in accordance with any one of the following selection criteria.

(1) The selecting unit 126 preferentially selects a radio terminal 10 of which a buffer amount is small by referring to "TEBS" included in the uplink control data. In other words, the radio terminal 10 of which a buffer amount is small is more likely to be selected as a decrease target terminal when compared with the radio terminal 10 of which a buffer amount is large.

(2) The selecting unit 126 preferentially selects a radio terminal 10 having a high happiness rate (Happy Sit Rate) by referring to "Happy Bit" included in the uplink control data in other words, the radio terminal 10 of which a happiness rate is high is more likely to be selected as a decrease target terminal than the radio terminal 10 of which a happiness rate is low. The happiness rate (the Happy Bit Rate) may be calculated as "Happy"/"Unhappy" in a predetermined period or "Happy"/("Happy"+"Unhappy") in a predetermined period.

(3) The selecting unit 126 preferentially selects a radio terminal 10 of which a transmission power ratio is low by referring to "UPH" included in the uplink control data. In other words, the radio terminal 10 of which a transmission power ratio is low is more likely to be selected as a decrease target terminal when compared with the radio terminal 10 of which a transmission power ratio is high. The "UPH" is a transmission power ratio that is a ratio of the Maximum UE Transmission Power to transmission power of DPCCH.

(4) The selecting unit 126 preferentially selects a radio terminal 10 of which a Priority Class is low. Each radio terminal 10 has a predetermined Priority Class. In other words, a radio terminal 10 of which a Priority Class is low is more likely to be selected as a decrease target terminal than the radio terminal 10 of which a Priority Class is high.

(5) The selecting unit 126 preferentially selects a radio terminal 10 having a large SG currently assigned as a transmission rate of the uplink user data. In other words, a radio terminal 10 to which a large SG is currently assigned is more likely to be selected as a decrease target terminal than the radio terminal 10 to which a small SG currently assigned.

(Operations and Effects)

In the second embodiment, in selecting a decrease target terminal, the following are taken into consideration: (1) buffer amount; (2) happiness rate (Happy Bit Rate); (3) UPH; (4) Priority Class; and (5) SG currently assigned.

Therefore, the number of radio terminals 10 communicable with the base station 100 can be increased, while adverse effects caused by decrease of an SG due to a transmission of transmission rate decrease data are suppressed.

Specifically, it is considered that since a radio terminal 10 with a small buffer amount has a small amount of uplink user data to be transmitted to the base station 100, the decrease of the SG results in small adverse effects.

It is considered that since a radio terminal 10 having a high happiness rate (Happy Bit Rate) is capable of successfully transmitting uplink user data, the decrease of the SG results in small adverse effects.

It is considered that since a radio terminal 10 having a low transmission power ratio (UPH) has a large transmission power of the DPCCH and is located at a cell edge, the decrease of the SG suppresses an interference to other cells.

Naturally, it is more preferable to decrease the SG assigned to a radio terminal 10 having a low Priority Class than to a radio terminal 10 having a high Priority Class.

By decreasing an SG of the radio terminal 10 to which a large SG is currently assigned, an assigned transmission rate can be decreased while the number of radio terminals 10 communicating with the base station 100 (cell) is maintained.

[Third Embodiment]

A third embodiment is described below. Differences between the second embodiment and the third embodiment are mainly described below. In the third embodiment, in selecting a decrease target terminal, all the following are considered: (1) selection criterion (A) using "TEBS"; (2) selection criterion (B) using "currently assigned transmission rate (SG)"; (3) selection criterion (C) using "Priority Class"; (4) selection criterion (D) using "happiness rate (Happy Bit Rate)"; and (5) selection criterion (E) using "UPH".

Specifically, the selecting unit 126 selects a group of radio terminals 10 (candidates of decrease target terminals) in accordance with each of the selection criteria (A) to (E). Subsequently, the selecting unit 126 selects a decrease target terminal from among the candidates of decrease target terminals in view of the weight of each of the selection criteria (A) to (E).

The weight of each of the selection criteria (A) to (E) have the following relationship: "weight of selection criterion (A)>weight of selection criterion (B)>weight of selection criterion (C)>weight of selection criterion (D)>weight of selection criterion (E)." In other words, a radio terminal 10 selected in accordance with the selection criterion (A) has high possibility to be selected as a decrease target terminal, and a radio terminal 10 selected in accordance with the selection criterion (E) has low possibility to be selected as a decrease target terminal.

However, the case is considered where radio terminals 10 selected in accordance with each of the selection criteria (A) to (E) overlap. In such a case, naturally a radio terminal 10 satisfying a plurality of selection criteria has high possibility to be selected as a decrease target terminal.

[Other Embodiments]

The present invention has been described by the above-described embodiments. However, it should not be understood that the description and drawings which constitute one part of this disclosure limit the invention. From this disclosure, various alternative embodiments, examples, operational techniques will be apparent to a person skilled in the art.

In the third embodiment mentioned above, in selecting a decrease target terminal, all the selection criteria (A) to (E) are considered, however the present invention is not limited to this. More specifically, in selecting the decrease target terminal, any two or more of the selection criteria (A) to (E) may be considered.

What is claimed is:

1. A radio communication system in which first radio terminals transmit uplink user data to a base station through an enhanced dedicated physical data channel and the base station transmits, to the first radio terminals, transmission rate control data for controlling a transmission rate of the uplink user data, wherein the base station includes:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, and the base station causes the total of the initial transmission rate and the assigned transmission rates to be equal to or less than the maximum receiving transmission rate by transmitting the transmission rate decrease data, wherein the selecting unit selects a first radio terminal of which the transmission rate exceeds a minimum transmission rate, as the decrease target terminal from among the first radio terminals, the minimum transmission rate being the transmission rate at least to be assigned to each of the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

2. A radio communication system in which first radio terminals transmit uplink user data to a base station through an enhanced dedicated physical data channel and the base station transmits, to the first radio terminals, transmission rate control data for controlling a transmission rate of the uplink user data, wherein the base station includes:
  a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, and the base station causes the total of the initial transmission rate and the assigned transmission rates to be equal to or less than the maximum receiving transmission rate by transmitting the transmission rate decrease data, wherein each of the first radio terminals includes a terminal side transmitting unit configured to transmit information indicating a buffer amount to the base station, the buffer amount being an amount of the uplink user data accumulated in a transmission buffer provided in each of the first radio terminals, and the selecting unit preferentially selects a first radio terminal of which the buffer amount is small, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

3. A radio communication system in which first radio terminals transmit uplink user data to a base station through an enhanced dedicated physical data channel and the base station transmits, to the first radio terminals, transmission rate control data for controlling a transmission rate of the uplink user data, wherein the base station includes:
  a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, and the base station causes the total of the initial transmission rate and the assigned transmission rates to be equal to or less than the maximum receiving transmission rate by transmitting the transmission rate decrease data, wherein each of the first radio terminals includes a terminal side transmitting unit configured to transmit happiness information to the base station, the happiness information indicating whether or not the transmission rate assigned to each of the first radio terminals is sufficient, and the selecting unit preferentially selects a first radio terminal having a high rate of the Happiness information indicating that the transmission rate is sufficient, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

4. A radio communication system in which first radio terminals transmit uplink user data to a base station through an enhanced dedicated physical data channel and the base station transmits, to the first radio terminals, transmission rate control data for controlling a transmission rate of the uplink user data, wherein
the base station includes:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
a base station side transmitting unit configured to transmit transmission rate decrease data to the decrease target terminal, the transmission rate decrease data being the transmission rate control data for giving an instruction to decrease the transmission rate, and
the base station causes the total of the initial transmission rate and the assigned transmission rates to be equal to or less than the maximum receiving transmission rate by transmitting the transmission rate decrease data, wherein
the transmission rate is determined based on a ratio of transmission power of the enhanced dedicated physical data channel to the transmission power of a dedicated physical control channel,
each of the first radio terminals includes a terminal side transmitting unit configured to transmit information indicating a transmission power ratio to the base station, the transmission power ratio being a ratio of maximum transmission power allowed for each of the first radio terminals to transmission power of the dedicated physical control channel, and
the selecting unit preferentially selects a first radio terminal of which the transmission power ratio is low, as the decrease target terminal from among the first radio terminals wherein
after the initial transmission rate of the first radio terminals is decreased by the assigned transmission rates by transmitting the transmission rate decrease data, the base station is configured to assign the initial transmission rate to the second terminal and accept the communication start request received from the second terminal.

5. A radio communication system in which first radio terminals transmit uplink user data to a base station through an enhanced dedicated physical data channel and the base station transmits, to the first radio terminals, transmission rate control data for controlling a transmission rate of the uplink user data, wherein
the base station includes:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
a base station side transmitting unit configured to transmit transmission rate decrease data to the decrease target terminal, the transmission rate decrease data being the transmission rate control data for giving an instruction to decrease the transmission rate, and
the base station causes the total of the initial transmission rate and the assigned transmission rates to be equal to or less than the maximum receiving transmission rate by transmitting the transmission rate decrease data, wherein
each of the first radio terminals has a predetermined priority class, and
the selecting unit preferentially selects a first radio terminal of which priority class is low, as the decrease target terminal from among the first radio terminals wherein
after the initial transmission rate of the first radio terminals is decreased by the assigned transmission rates by transmitting the transmission rate decrease data, the base station is configured to assign the initial transmission rate to the second terminal and accept the communication start request received from the second terminal.

6. A radio communication system in which first radio terminals transmit uplink user data to a base station through an enhanced dedicated physical data channel and the base station transmits, to the first radio terminals, transmission rate control data for controlling a transmission rate of the uplink user data, wherein
the base station includes:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, and the base station causes the total of the initial transmission rate and the assigned transmission rates to be equal to or less than the maximum receiving transmission rate by transmitting the transmission rate decrease data, wherein the transmission rate is determined based on a ratio of transmission power of the enhanced dedicated physical data channel to the transmission power of a dedicated physical control channel, and the selecting unit preferentially selects a first radio terminal of which the transmission rate is high, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

7. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:

(A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

(B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein the selecting unit selects a first radio terminal of which the transmission rate exceeds a minimum transmission rate, as the decrease target terminal from among the first radio terminals, the minimum transmission rate being the transmission rate at least to be assigned to each of the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

8. A base station which receives uplink user data from first radio terminals through an enhanced dedicated physical data channel and transmits, to the first radio terminals, transmission rate control data for controlling a transmission rate of the uplink user data, the base station comprising:

a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein the selecting unit selects a first radio terminal of which the transmission rate exceeds a minimum transmission rate, as the decrease target terminal from among the first radio terminals, the minimum transmission rate being the transmission rate at least to be assigned to each of the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

9. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:

(A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

(B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein each of the first radio terminals includes a terminal side transmitting unit configured to transmit information indicating a buffer amount to the base station, the buffer amount being an amount of the uplink user data accumulated in a transmission buffer provided in each of the first radio terminals, and the selecting unit preferentially selects a first radio terminal of which the buffer amount is small, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

10. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:

(A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

(B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein each of the first radio terminals includes a terminal side transmitting unit configured to transmit happiness information to the base station, the happiness information indicating whether or not the transmission rate assigned to each of the first radio terminals is sufficient, and the selecting unit preferentially selects a first radio terminal having a high rate of the Happiness information indicating that the transmission rate is sufficient, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

11. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:

(A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

(B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein the transmission rate is determined based on a ratio of transmission power of the enhanced dedicated physical data channel to the transmission power of a dedicated physical control channel, each of the first radio terminals includes a terminal side transmitting unit configured to transmit information indicating a transmission power ratio to the base station, the transmission power ratio being a ratio of maximum transmission power allowed for each of the first radio terminals to transmission power of the dedicated physical control channel, and the selecting unit preferentially selects a first radio terminal of which the transmission power ratio is low, as the decrease target terminal from among the first radio terminals; and wherein after decreasing the initial transmission rate and the assigned transmission rates of the first radio terminals by transmitting the rate decrease data, assigning the initial transmission rate to the second terminal and accepting the communication start request received from the second terminal.

12. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:
- (A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
- (B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
- (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein each of the first radio terminals has a predetermined priority class, and the selecting unit preferentially selects a first radio terminal of which priority class is low, as the decrease target terminal from among the first radio terminals; and wherein after decreasing the initial transmission rate and the assigned transmission rates of the first radio terminals by transmitting the rate decrease data, assigning the initial transmission rate to the second terminal and accepting the communication start request received from the second terminal.

13. A radio communication method by which first radio terminals transmit uplink user data to a base station through an enhanced dedicated physical data channel and the base station transmits, to the first radio terminals, transmission rate control data for controlling a transmission rate of the uplink user data, the method comprising:
- (A) causing the base station to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
- (B) causing the base station to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
- (C) causing the base station to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein the transmission rate is determined based on a ratio of transmission power of the enhanced dedicated physical data channel to the transmission power of a dedicated physical control channel, and the selecting unit preferentially selects a first radio terminal of which the transmission rate is high, as the decrease target terminal from among the first radio terminals; and wherein after decreasing the initial transmission rate and the assigned transmission rates of the first radio terminals by transmitting the rate decrease data, assigning the initial transmission rate to the second terminal and accepting the communication start request received from the second terminal.

14. A base station which receives uplink user data from first radio terminals through an enhanced dedicated physical data channel and transmits, to the first radio terminals, transmission rate control data for controlling a transmission rate of the uplink user data, the base station comprising:
- a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
- a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
- a base station side transmitting unit configured to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein each of the first radio terminals includes a terminal side transmitting unit configured to transmit information indicating a buffer amount to the base station, the buffer amount being an amount of the uplink user data accumulated in a transmission buffer provided in each of the first radio terminals, and the selecting unit preferentially selects a first radio terminal of which the buffer amount is small, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

15. A base station which receives uplink user data from first radio terminals through an enhanced dedicated physical data channel and transmits, to the first radio terminals, transmission rate control data for controlling a transmission rate of the uplink user data, the base station comprising:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
a base station side transmitting unit configured to transmit transmission rate decrease data to the decrease target terminal, the transmission rate decrease data being the transmission rate control data for giving an instruction to decrease the transmission rate, wherein
the base station causes the total of the initial transmission rate and the assigned transmission rates to be equal to or less than the maximum receiving transmission rate by transmitting the transmission rate decrease data, wherein
each of the first radio terminals includes a terminal side transmitting unit configured to transmit happiness information to the base station, the happiness information indicating whether or not the transmission rate assigned to each of the first radio terminals is sufficient, and
the selecting unit preferentially selects a first radio terminal having a high rate of the Happiness information indicating that the transmission rate is sufficient, as the decrease target terminal from among the first radio terminals; wherein
after the initial transmission rate of the first radio terminals is decreased by the assigned transmission rates by transmitting the transmission rate decrease data, the base station is configured to assign the initial transmission rate to the second terminal and accept the communication start request received from the second terminal.

16. A base station which receives uplink user data from first radio terminals through an enhanced dedicated physical data channel and transmits, to the first radio terminals, transmission rate control data for controlling a transmission rate of the uplink user data, the base station comprising:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
a base station side transmitting unit configured to transmit transmission rate decrease data to the decrease target terminal, the transmission rate decrease data being the transmission rate control data for giving an instruction to decrease the transmission rate, wherein
the base station causes the total of the initial transmission rate and the assigned transmission rates to be equal to or less than the maximum receiving transmission rate by transmitting the transmission rate decrease data, wherein
the transmission rate is determined based on a ratio of transmission power of the enhanced dedicated physical data channel to the transmission power of a dedicated physical control channel,
each of the first radio terminals includes a terminal side transmitting unit configured to transmit information indicating a transmission power ratio to the base station, the transmission power ratio being a ratio of maximum transmission power allowed for each of the first radio terminals to transmission power of the dedicated physical control channel, and
the selecting unit preferentially selects a first radio terminal of which the transmission power ratio is low, as the decrease target terminal from among the first radio terminals; wherein
after the initial transmission rate of the first radio terminals is decreased by the assigned transmission rates by transmitting the transmission rate decrease data, the base station is configured to assign the initial transmission rate to the second terminal and accept the communication start request received from the second terminal.

17. A base station which receives uplink user data from first radio terminals through an enhanced dedicated physical data channel and transmits, to the first radio terminals, transmission rate control data for controlling a transmission rate of the uplink user data, the base station comprising:
a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;
a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and
a base station side transmitting unit configured to transmit transmission rate decrease data to the decrease target terminal, the transmission rate decrease data being the transmission rate control data for giving an instruction to decrease the transmission rate, wherein
the base station causes the total of the initial transmission rate and the assigned transmission rates to be equal to or less than the maximum receiving transmission rate by transmitting the transmission rate decrease data, wherein each of the first radio terminals has a predetermined priority class, and the selecting unit preferentially selects a first radio terminal of which priority class is low, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

18. A base station which receives uplink user data from first radio terminals through an enhanced dedicated physical data channel and transmits, to the first radio terminals, transmission rate control data for controlling a transmission rate of the uplink user data, the base station comprising:

a determination unit configured to determine whether or not a total of an initial transmission rate and assigned transmission rates exceeds a maximum receiving transmission rate assignable by the base station when the base station receives a communication start request from a second radio terminal, the initial transmission rate being the transmission rate to be firstly assigned to the second radio terminal, the assigned transmission rates being transmission rates which the base station has already assigned to the first radio terminals;

a selecting unit configured to select a decrease target terminal from among the first radio terminals, when the total of the initial transmission rate and the assigned transmission rates exceeds the maximum receiving transmission rate, the decrease target terminal being a first radio terminal for which the transmission rate is to be decreased; and a base station side transmitting unit configured to transmit transmission rate decrease data to the decrease target terminal, the transmission rate decrease data being the transmission rate control data for giving an instruction to decrease the transmission rate, wherein the base station causes the total of the initial transmission rate and the assigned transmission rates to be equal to or less than the maximum receiving transmission rate by transmitting the transmission rate decrease data, wherein the transmission rate is determined based on a ratio of transmission power of the enhanced dedicated physical data channel to the transmission power of a dedicated physical control channel, and the selecting unit preferentially selects a first radio terminal of which the transmission rate is high, as the decrease target terminal from among the first radio terminals; wherein after the initial transmission rate of the first radio terminals is decreased by the assigned transmission rates by transmitting the transmission rate decrease data, the base station is configured to assign the initial transmission rate to the second terminal and accept the communication start request received from the second terminal.

\* \* \* \* \*